United States Patent
Stonecypher

[11] Patent Number: 5,500,766
[45] Date of Patent: Mar. 19, 1996

[54] BLIND SPOT SIDE MIRROR

[76] Inventor: Bob Stonecypher, 1383 Fahlander Dr. S., Columbus, Ohio 43229

[21] Appl. No.: 433,746

[22] Filed: May 4, 1995

[51] Int. Cl.$^6$ .............................. G02B 5/08; G02B 7/182; B60R 1/06
[52] U.S. Cl. .......................... 359/605; 359/855; 359/865; 359/872; 359/877
[58] Field of Search ..................... 359/603, 604, 359/605, 606, 607, 843, 855, 864, 865, 872, 877

[56] References Cited

U.S. PATENT DOCUMENTS

| | | | |
|---|---|---|---|
| 2,916,967 | 12/1959 | Husak | 359/855 |
| 3,408,136 | 10/1968 | Travis . | |
| 3,625,597 | 12/1971 | Jones | 359/606 |
| 3,826,563 | 7/1974 | Davis | 359/865 |
| 4,022,520 | 5/1977 | Scifres | 359/855 |
| 4,031,772 | 6/1977 | Decastri | 359/605 |
| 4,639,103 | 1/1987 | Hill . | |
| 4,678,294 | 7/1987 | Van Nostrand | 359/865 |
| 4,711,538 | 12/1987 | Ohs . | |
| 4,714,322 | 12/1987 | Cook | 359/606 |
| 4,917,485 | 4/1990 | Baldwin . | |
| 4,936,670 | 6/1990 | Yoo . | |
| 4,988,068 | 1/1991 | Yamana . | |
| 5,115,352 | 5/1992 | Do Espirito Santo | 359/877 |

FOREIGN PATENT DOCUMENTS

| | | | |
|---|---|---|---|
| 0310261 | 4/1989 | European Pat. Off. | 359/865 |
| 3502203 | 7/1986 | Germany | 359/855 |
| 0562110 | 5/1975 | Switzerland | 359/855 |

*Primary Examiner*—Ricky D. Shafer
*Attorney, Agent, or Firm*—Terry M. Gernstein

[57] ABSTRACT

A side mirror for a motor vehicle includes a day/night mirror having a planar reflecting surface and a blind spot mirror having a planar reflecting surface. The mirror includes a housing which covers the day/night mirror in a manner that prevents overhead lights from showing a double image. The day/night mirror reflecting surface is angled with respect to the blind spot mirror reflecting surface, and the blind spot reflecting surface is angled with respect to the day/night mirror reflecting surface in a horizontal plane when the mirror is mounted on the vehicle. Each of the mirrors is mounted on a spherical ball, and the mirrors can be moved independently of each other by a various systems having the controls remote from the mirror inside the vehicle. The systems include a cable system, or an electrical system or a mechanical system. The day/night mirror has an additional control to position the mirror for night driving as well as for day driving.

18 Claims, 6 Drawing Sheets

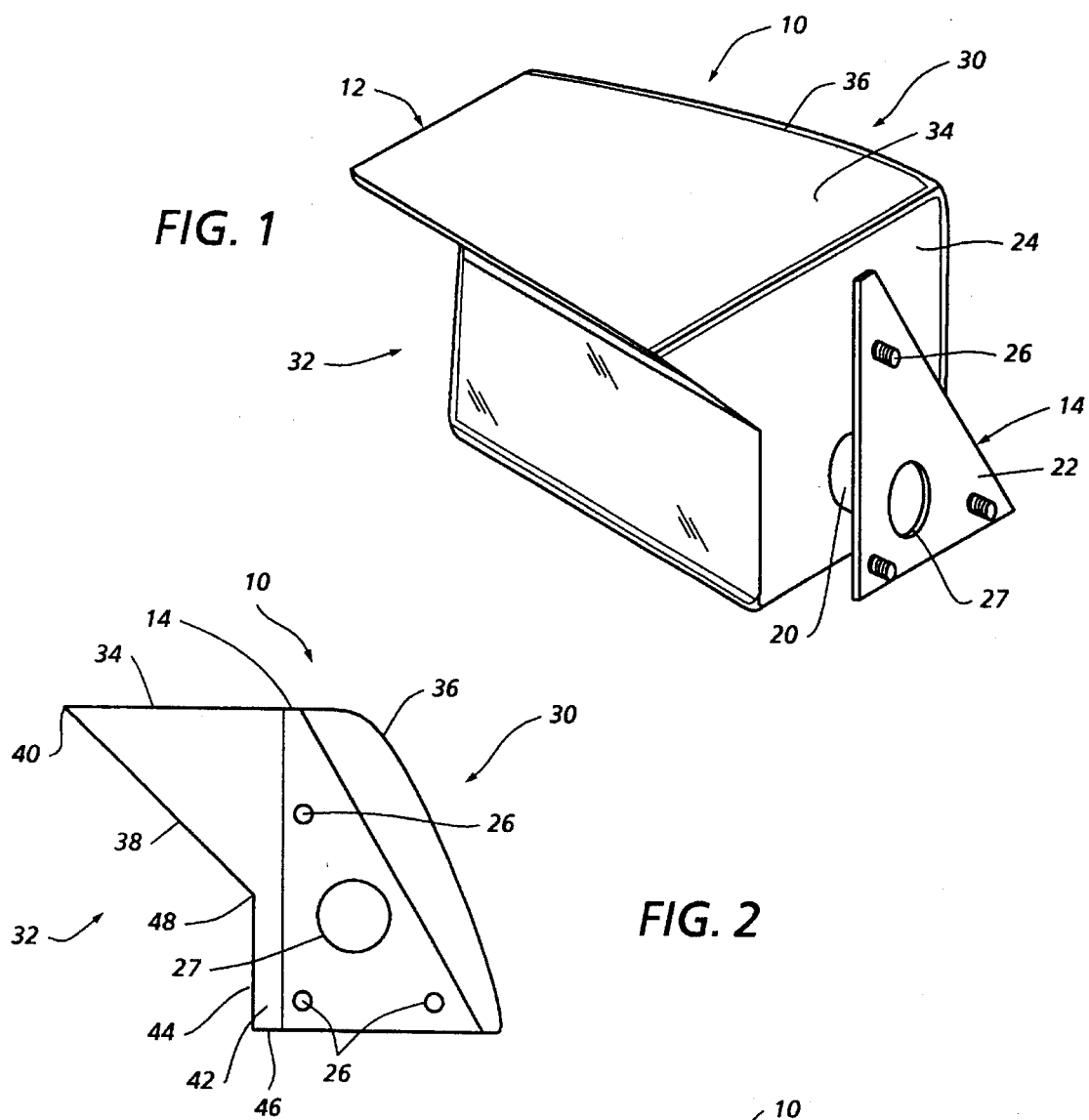
FIG. 1
FIG. 2
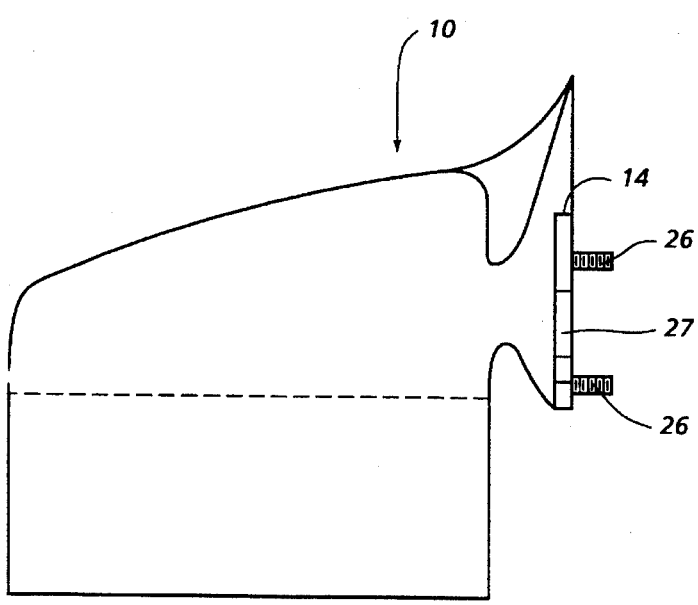
FIG. 3

5,500,766

BLIND SPOT SIDE MIRROR

TECHNICAL FIELD OF THE INVENTION

The present invention relates to the general art of motor vehicles, and to the particular field of rear view mirrors for motor vehicles, and specifically, to rear view mirrors having means for compensating for blind spots.

BACKGROUND OF THE INVENTION

Nearly every person who has driven a motor vehicle has experienced a near accident when changing lanes because a vehicle was in a blind spot and the driver did not see the vehicle. For this reason, good driving practices suggest that the driver actually turn their head and view the blind spot area. However, this procedure requires the driver to remove his or her eyes from the road in front of the vehicle.

Accordingly, the art has developed many proposals for adding accessories to motor vehicles and their mirrors to permit a driver to view a blind spot. While somewhat successful, these accessories still have several disadvantages. For example, some of the accessories distort the image or change the size of the image. Still other accessories do not compensate for night driving conditions, while some other accessories are subject to glare from the lights of other vehicles. Glare might be focused into a driver's eyes thereby creating a distraction or a temporary blinding of the driver. Some mirrors that are located inside the vehicle have means for changing them to night driving conditions; however, the inventor is not aware of any side mirror that has a blind spot compensator and which also can be adjusted for night driving conditions.

Another significant disadvantage of those mirrors known to the inventor is the possibility that overhead objects and night lights may create a double image or a ghost image in the mirror. Such a double or ghost images may distract or disorient a driver or lead to false information being presented to the driver.

Still further, many mirrors which include means for compensating for vehicle blind spots cannot have the mirror and the blind spot compensator means adjusted independently of each other. This may lead to a situation where a driver, because of his or her position relative to the mirror, is forced to select a position of the mirror that creates glare because that is the only position in which the mirror will provide a blind spot coverage for that particular driver.

Therefore, there is a need for a side mirror for a motor vehicle that displays the entire field behind the vehicle, including the so-called blind spot without distortion and which is not subject to glare, and which can be altered for night driving.

OBJECTS OF THE INVENTION

It is a main object of the present invention to provide a side mirror for a motor vehicle that displays a blind spot without distortion.

It is another object of the present invention to provide a side mirror for a motor vehicle that displays a blind spot without distortion and which can be adjusted for night driving.

It is another object of the present invention to provide a side mirror for a motor vehicle that displays a blind spot without distortion and which is not subject to glare.

It is another object of the present invention to provide a side mirror for a motor vehicle that displays a blind spot without distortion in which the component parts of the mirror can be adjusted independently of each other.

It is a specific object of the present invention to provide a side mirror for a motor vehicle that displays a blind spot without distortion and which has a housing that prevents overhead objects and night lights from showing a double image.

SUMMARY OF THE INVENTION

These, and other, objects are achieved by a side mirror for a motor vehicle, such as a land vehicle, which has a day/night mirror and a blind spot mirror which are independently adjustable, and each of which has a planar reflecting surface whereby there is no distortion of the reflected image. The mirror of the present invention also has a housing that is sized and oriented with respect to the mirrors to prevent night lights and/or overhead lights from producing false or distorted images to the driver. The mirrors can be adjusted from inside the vehicle and can be adjusted for night driving as well as for the orientation of the driver.

Specifically, the mirror housing has a top section that extends beyond a bottom section with the day/night mirror being offset both vertically and horizontally from the blind spot mirror, and with the housing top section extending rearwardly from the housing bottom section.

For the purpose of this disclosure, directions will be taken with reference to vehicle forward motion. Thus, a forward direction will be forward of the vehicle, and a rearward direction will be toward the aft end of the vehicle, with port side and starboard side directions being right and left sides of the forwardly moving vehicle respectively. Also, for the sake of convenience, a vertical plane will be a plane that extends upwardly from the ground on which the vehicle is traveling, and a horizontal plane will be a plane in which the vehicle is moving, that is a plane containing, or which is parallel to, the road over which the vehicle is moving. Still further, for the sake of convenience, positions and orientations will be disclosed for a mirror that is mounted in place on a vehicle. However, it is to be understood that no limitations are intended by these conventions, and they are made strictly for the sake of convenience of description.

The mirrors are adjusted remotely therefrom inside the vehicle, using cables that are attached to manually movable means or to electronically controlled means and can be adjusted in pitch and yaw planes. In the preferred form of the mirror, the blind spot mirror is oriented at an angle of approximately twelve degrees with respect to the day/night mirror in a horizontal plane, and is offset forwardly from that day/night mirror in the horizontal plane.

The mirrors are mounted in an outer shell and, in the preferred form, (rotated) from each other by twelve degrees, plus or minus ten degrees. The offset tolerance permits the mirror to be placed on a variety of vehicles and still have the desired relation to the driver. Since all vehicles do not have the same relation of driver to mirror, this tolerance will permit the mirror to be adaptable to a large variety of vehicles. The top of the outer shell extends beyond the mirrors for a distance equal to two times the height of the day/night mirror. This extension prevents overhead objects and night lights from showing double images. The shape and size of the remaining part of the outer shell and mounting base can be determined by the manufacturer in order to match the contour of any vehicle.

BRIEF DESCRIPTION OF THE DRAWING FIGURES

FIG. 1 is a top, front and side perspective view of a side mounted mirror embodying the present invention.

FIG. 2 is a side elevational view thereof, the side opposite being a mirror image of the side shown.

FIG. 3 is a top plan view thereof.

DETAILED DESCRIPTION OF THE PREFERRED EMBODIMENT OF THE INVENTION

Figure 4:
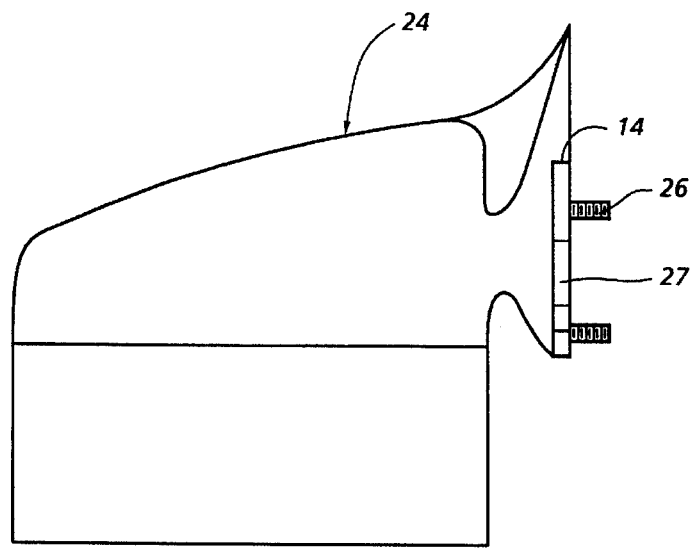
FIG. 4 is a bottom plan view thereof.
Figure 5:
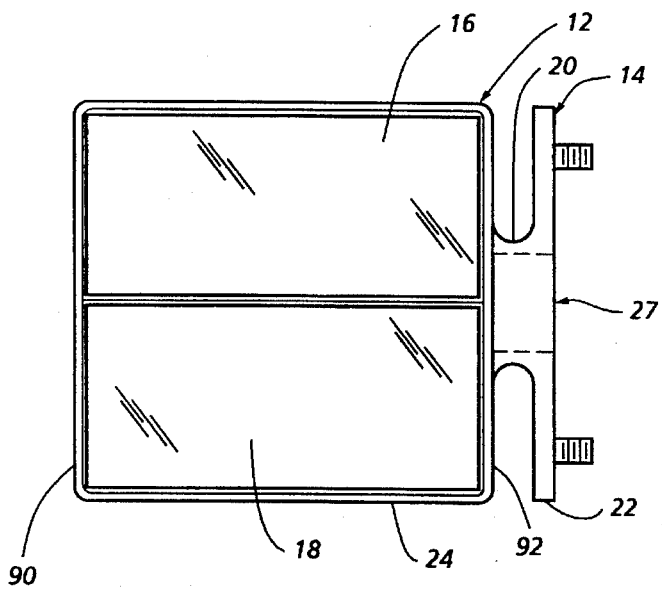
FIG. 5 is a front elevational view thereof.
Figure 6:
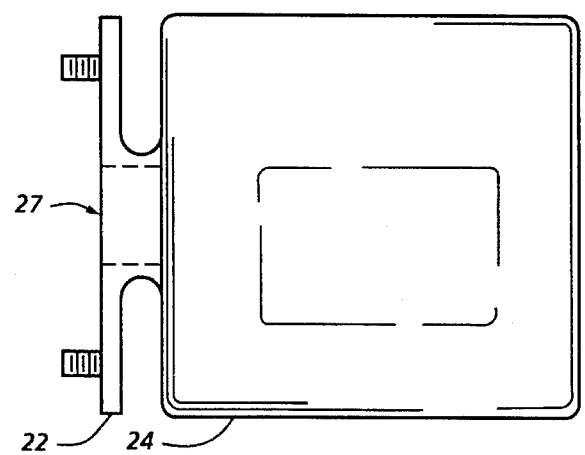
FIG. 6 is a rear elevational view thereof.

Shown in FIGS. 1–6 is a rear view mirror 10 which is mounted on the side of a vehicle, such as a land vehicle, to display the rear and side fields to the driver. A mirror such as mirror 10 is mounted on each side of the vehicle, and these mirrors are identical in all respects except, in some cases, size. Therefore, only one mirror will be described. Mirror 10 includes a housing 12 which has a means 14 for mounting the housing on the vehicle. As shown in FIG. 5, two mirrors, a day/night mirror 16 and a blind spot mirror 18 are mounted in housing 12.

Figure 8:
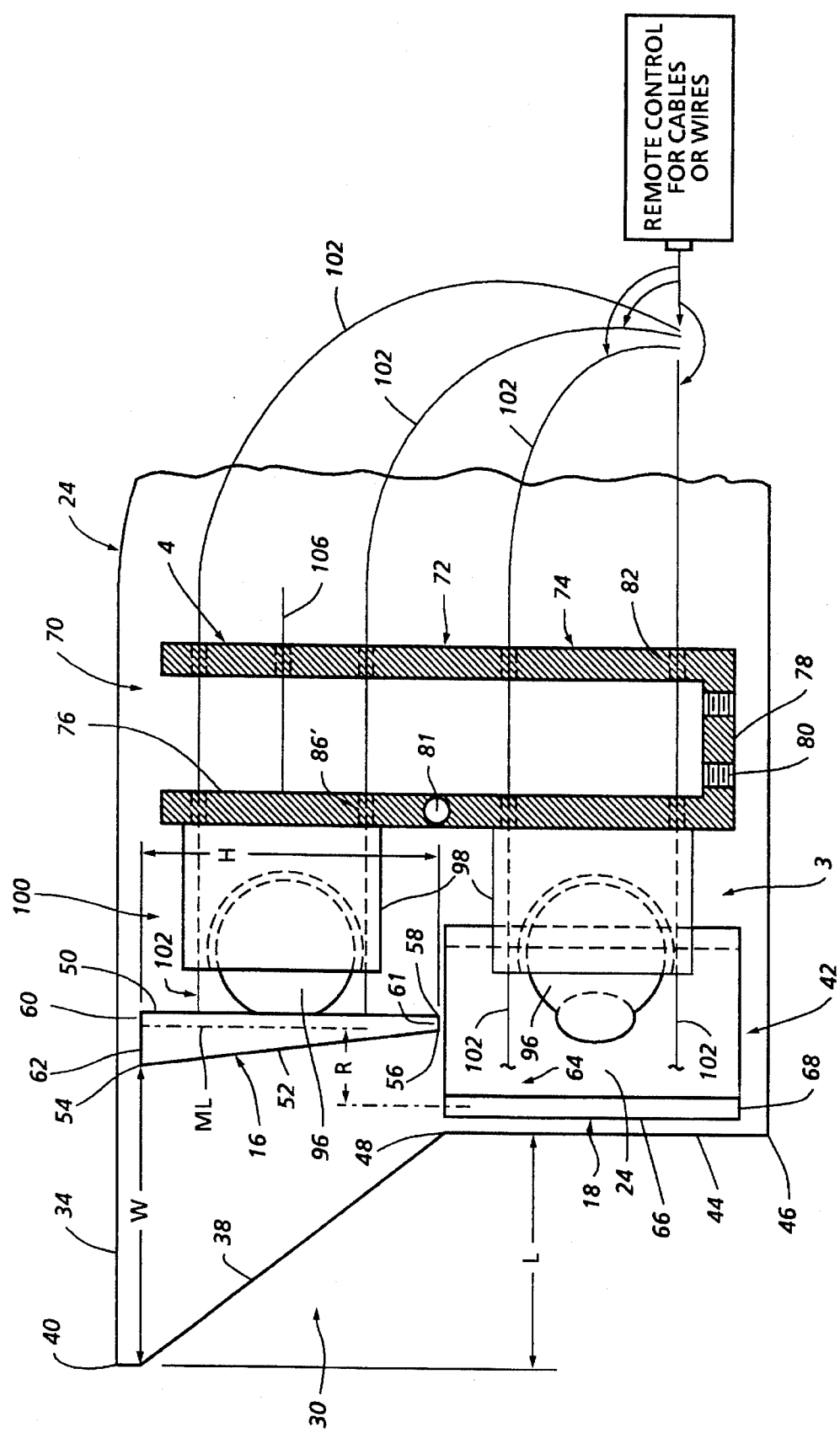
FIG. 8 is a schematic of a side elevation of the mirrors and the supports with the housing partially cutaway.

Specifically, housing 12 includes a pedestal 20 connecting a base 22 to main housing section 24. Fastener means for mounting the mirror on a vehicle are fixed to base 22. An access hole 27 for accommodating cables or wires leading to the interior of the vehicle is defined in base 22. The purpose of the cables and wires will be understood from the following disclosure. Housing 12 includes a forward end 30 and an aft end 32, with forward end being aerodynamically shaped as that end faces the oncoming air as the vehicle moves in a forward direction. As shown in FIGS. 2, 3 and 8, the housing main section includes a top 34 having a forward edge 36 in forward end 30 and which extends in the rearward direction toward aft end 32 and a rear edge 38. As shown, rear edge 38 slants downwardly and forwardly from rear rim 40 of the housing. The purpose of this slanting will be understood from the following disclosure.

The housing main section also includes a bottom section 42 which extends from forward end 30 rearward to rear section 32 with a rear edge 44 extending upwardly from a bottom corner 46 toward top 34. Rear edge 44 is located forwardly of rim 40 and is spaced therefrom in a horizontal plane by a distance L, and rear edge 44 intersects rear edge 38 at corner 48 located near the vertical midpoint of the housing.

As best shown in FIG. 8, day/night mirror 16 includes a planar forward surface 50 and a planar reflecting surface 52 which slants forwardly and downwardly from a top corner 54 to a bottom corner 56. Surface 50 is vertically oriented between bottom front corner 58 and top front corner 60 with mirror 16 having a height dimension H measured between bottom edge 61 and top edge 62. Mirror 16 is mounted in housing 12 to be spaced from rim 40 and from intersection 48 so housing top section 34 extends rearwardly from reflecting surface 52 and mirror 16 is located inside the housing. Locating mirror 16 inside the housing permits the housing to shield the mirror from overhead lights and from glare at night whereby double and ghost images do not appear in mirror 16. Specifically, locating mirror 16 so that reflecting surface top edge 54 is spaced from rim 40 by a distance W that is equal to or greater than height H will prevent these double or ghost images.

Figure 7:
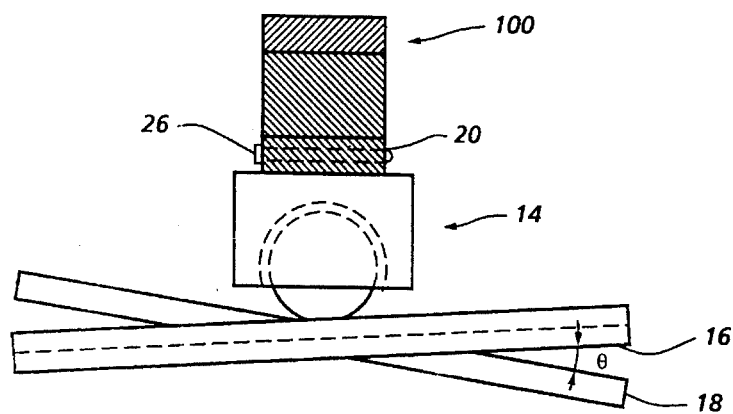
FIG. 7 is a schematic showing a top plan view of the mirrors and the support means therefor.

Blind spot mirror 18 is mounted beneath mirror 16 in the housing. Mirror 18 has a planar forward surface 64 and a planar reflecting surface 66, both of which extend vertically upward from a bottom edge 68. As shown in FIGS. 7 and 8, mirror 18 has a midline ML that is parallel to surface 50 and intersects top surface 62 at a midpoint thereon, with the midline ML being offset from mirror 16 in the rearward direction by a distance R as measured in a horizontal plane, and is angled at an angle $\Theta$ as measured in a horizontal plane. In the preferred form of the mirror, angle e is twelve degrees, but can be greater than or equal to two degrees or less than or equal to twenty-two degrees. As will be understood by one skilled in the art based on the teaching of this disclosure, angle $\Theta$ is selected to orient blind spot mirror 18 to the port side or to the starboard side of day/night mirror 16 to show the blind spot of the vehicle on the side of the vehicle associated with mirror 10.

The mirrors are movably mounted inside the housing by a support means generally indicated in FIG. 8 at 70. Support means 70 includes a U-shaped bracket 72 having legs 74 and 76 and a bight section 78. Section 78 can be mounted on housing by fasteners (not shown) extending through holes 80, or by a pivot 81. Leg 74 includes a plurality of cable-accommodating holes, such as hole 82 as does leg 76, such as hole 86' with holes 86 and 86' being aligned for a purpose that will be understood based on the ensuing disclosure. It is noted that legs 74 and 76 extend for essentially the entire width of the housing as measured between sides 90 and 92 (see FIG. 5) so the holes 86 and 86' are spaced apart in two planes, a vertical plane and a horizontal plane. Support means 70 further includes a frame 92 on each of the mirrors. Each frame includes a rear 94 which is mounted to a spherical ball 96 for movement therewith. The ball 96 of each mirror is supported in a frame 98 which is securely mounted to the housing by a fastener 99 and in which the ball can rotate as will be understood from the following discussion.

Figure 9:
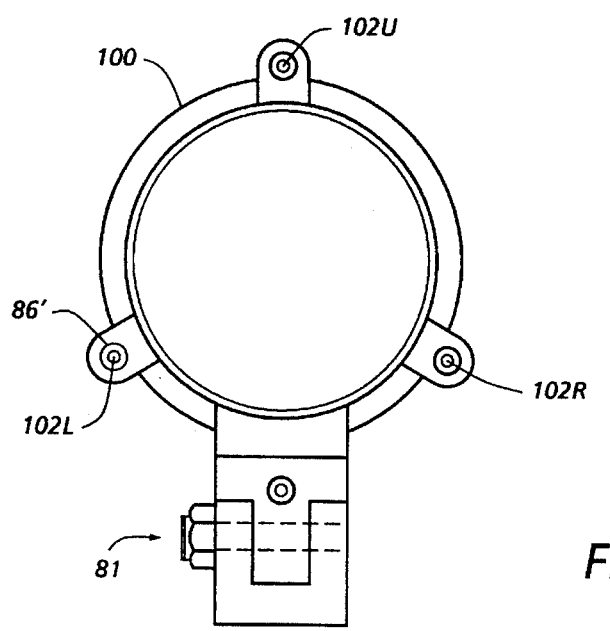
FIG. 9 is a detail of a day/night mirror and the support means therefor.
Figure 10:
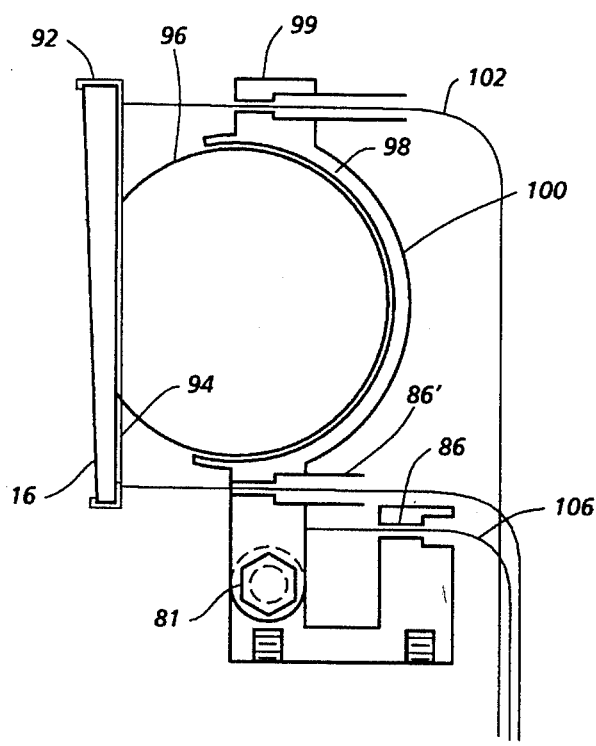
FIG. 10 is a detail of a front view of the mirror shown in FIG. 9.
Figure 11:
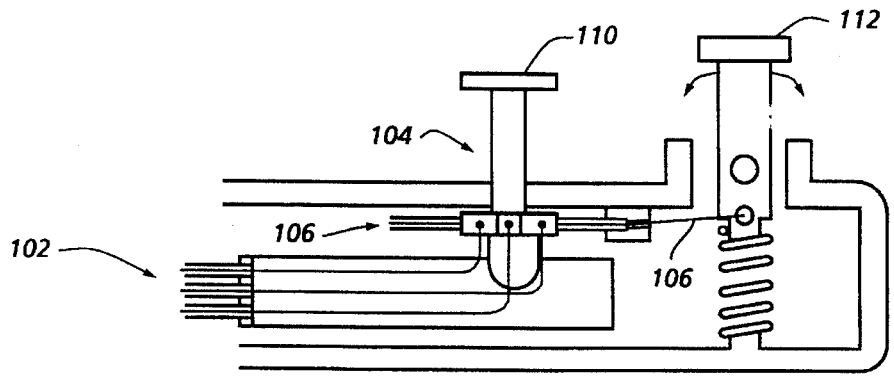
FIG. 11 is a schematic showing one form of a control means for adjusting the positions of the mirrors.

As is best shown in FIGS. 8, 9 and 10, the mounting means is part of a moving means 100. Means 100 includes a plurality of cables, such as cables 102 attached to the frames of the mirrors and to a control means 104 (see FIG. 11) located inside the vehicle and which is operated to re-orient each mirror. As shown in FIG. 10, the cables are attached to the mirror frames at least three locations. Since the mirror frame is mounted on a swiveling ball, tensioning the cables will move the mirror. The three locations are selected to orient the mirror in at least two planes, and to move the mirror in a pitch movement or in a yaw movement or some combination thereof by moving the proper cables. Thus, for example moving cables 102L or 102R will produce a yaw movement; whereas, moving cable 102U will produce a pitch movement. Pivot 81 is used to further adjust the mirrors in a pitch movement. This further pivot movement is used to move mirror 16 between a day orientation and a night orientation and is effected by means of cable 106 connected to leg 76 and to control 104.

The mirrors can be moved either manually or by means of an electronically controlled motor. To this purpose, control means 104 includes a first adjustment switch 110 for moving the mirrors via cables 102, and second adjustment switch 112 for moving the mirrors via an electric motor assembly. Switch 110 is movable in several planes to manipulate cables 102, whereas switch 112 is movable in only one plane to move cable 106 to orient the mirrors via cable 106, bracket 72 and pivot 81 between a day orientation and a night orientation.

Figure 12:
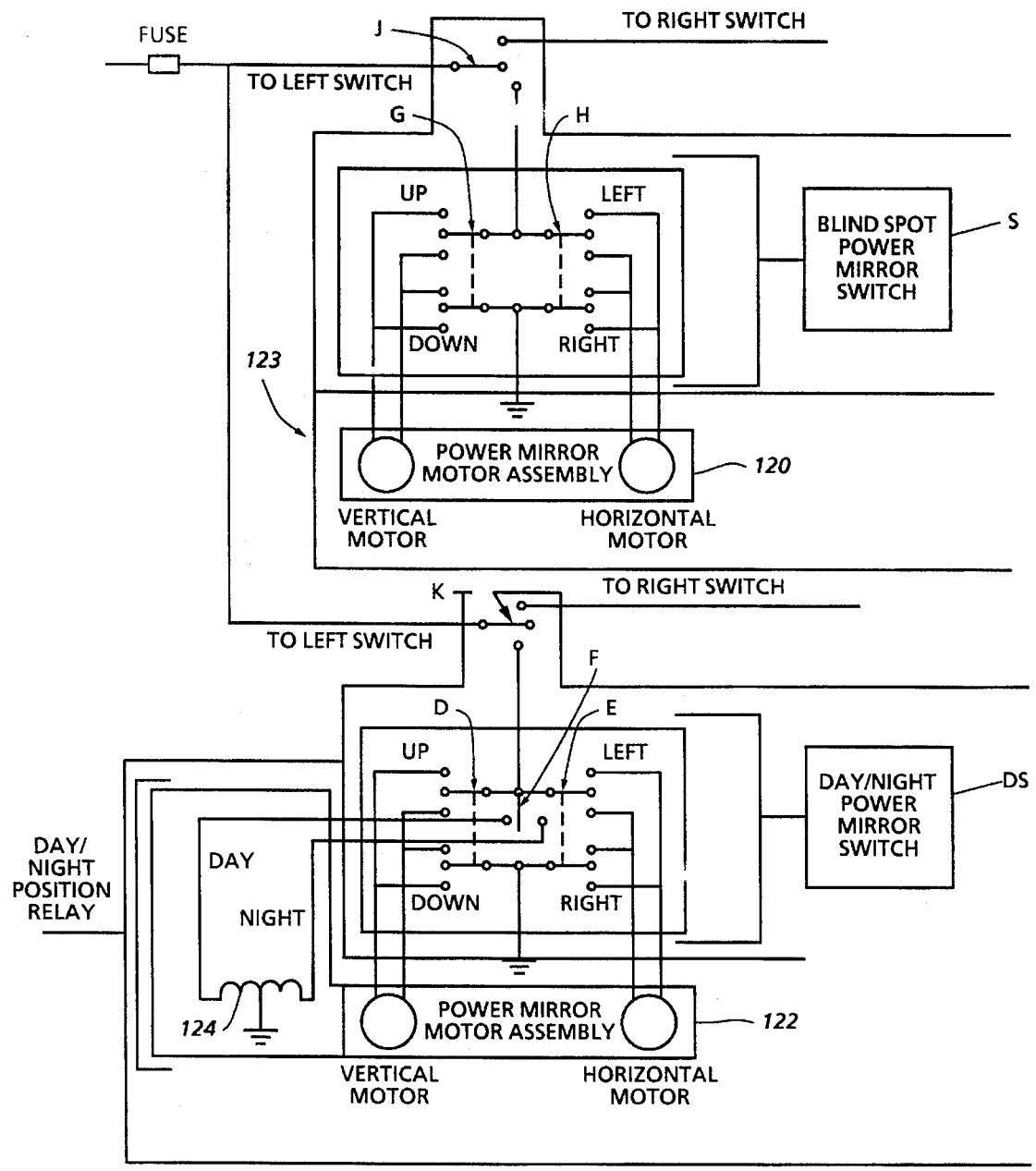
FIG. 12 is a schematic showing an electrical control for the mirrors.

Alternatively, as shown in FIG. 12, the switches of control means 104 can be connected via a suitable electric circuit to motors 120 and 122 which are connected to the mirrors, and to a relay 124 to move the mirror to the day or to the night position. It is noted that the blind spot mirror is mounted on assembly 123 which is electrical and can replace elements 81–106 located inside the mirror shell. A blind spot mirror power switch S is located inside the vehicle. A day/night power switch DS is also located inside the vehicle. The day/night mirror is mounted on assembly 122. Assembly 122 is an electrical assembly and replaces elements 81–106 for the day/night mirror mounted inside the mirror shell.

Specifically, switch K will select right or left blind spot mirror, switch D will adjust the mirror to image up or down, switch E will adjust the mirror to image left or right, switch F will tilt the mirror for day or night vision by energizing relay 124 which is mechanically attached to the power mirror motor assembly 120. Relay 124 will tilt the mirror to either a day or a night driving position.

The blind spot power mirror assembly includes switch J which is used to select the right or the left side blind spot side mirror, switch G will adjust the mirror to image up or down, while switch H will adjust the mirror to image right or left.

Figure 13A:
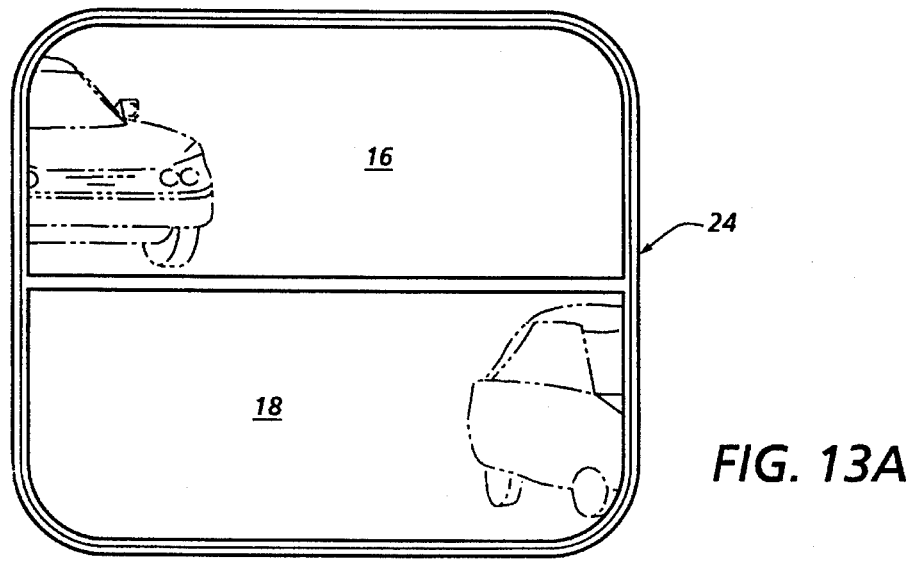
FIGS. 13A and 13B show left and right mirrors and the images as seen in these mirrors, respectively.
Figure 13B:
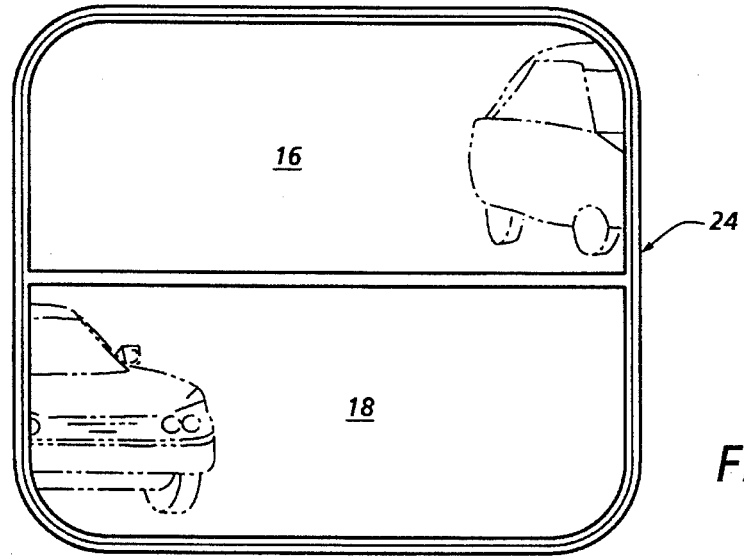

The views seen by a driver are shown in FIGS. 13A and 13B, it being noted that the starboard side mirror is slightly larger than the port side mirror.

It is understood that while certain forms of the present invention have been illustrated and described herein, it is not to be limited to the specific forms or arrangements of parts described and shown.

I claim:

1. A rear view mirror for a vehicle comprising:
    A) a housing which includes
        1) mounting means on said housing for mounting said housing on a vehicle,
        2) a forward end, and
        3) a rear end;
    B) a top having a forward portion at said forward end and extending toward a rear end of the vehicle when said housing is mounted on the vehicle and a rear rim located at a rearmost location on said top;
    C) a bottom having a forward portion at said forward end and extending toward the rear end of the vehicle when said housing is mounted on the vehicle and a rear corner located at a rearmost location on said bottom, said rear rim being spaced from said rear corner in the rearward direction of the vehicle whereby said rear rim and bottom corner are offset from each other in both a horizontal plane and in a vertical plane when said housing is mounted on the vehicle;
    D) a top aft edge having a top edge thereof attached to said rear rim and extending downwardly from said rear rim and toward said forward portion to be slanted downwardly and forwardly when said housing is mounted on the vehicle;
    E) a bottom aft edge having a bottom edge thereof connected to said rear corner and extending upwardly from said bottom corner when said housing is mounted on the vehicle;
    F) said top aft edge and said bottom aft edge intersecting each other at a location spaced from said top and from said bottom and at a location spaced both vertically and horizontally from said rear rim;
    G) a day/night mirror located inside said housing and spaced from said rear aft edge;
    H) a blind spot mirror located inside said housing and spaced from said day/night mirror;
    I) a support means mounted in said housing for supporting said day/night mirror and said blind spot mirror;
    J) day/night mirror moving means connected to said day/night mirror for moving said day/night mirror with respect to said blind spot mirror;
    K) blind spot mirror moving means connected to said blind spot mirror for moving said blind spot mirror with respect to said day/night mirror; and
    L) control means connected to said day/night mirror moving means and to said blind spot mirror moving means for controlling movement of said day/night mirror and said blind spot mirror independently of each other.

2. The rear view mirror defined in claim 1 wherein said day/night mirror has a top surface, a planar forward surface and a planar reflecting surface, with said reflecting surface being angled downwardly and rearwardly from said top surface.

3. The rear view mirror defined in claim 2 wherein said blind spot mirror has a planar reflecting surface.

4. The rear view mirror defined in claim 3 wherein said blind spot mirror is oriented at an angle with respect to said day/night mirror in a horizontal plane.

5. The rear view mirror defined in claim 4 wherein said angle is greater than or equal to two degrees and less than or equal to twenty-two degrees.

6. The rear view mirror defined in claim 5 wherein said day/night mirror is located above said blind spot mirror.

7. The rear view mirror defined in claim 4 wherein said support means includes a U-shaped bracket in said housing.

8. The rear view mirror defined in claim 7 wherein said U-shaped bracket includes a plurality of cable-accommodating holes defined therein.

9. The rear view mirror defined in claim 8 including pivot means for mounting said U-.shaped bracket on said housing.

10. The rear view mirror defined in claim 8 wherein said support means further includes a day/night mirror frame and a blind spot mirror frame.

11. The rear view mirror defined in claim 10 wherein said support means further includes a day/night mirror holding frame secured to said U-shaped bracket and a blind spot mirror holding frame secured to said U-shaped bracket.

12. The rear view mirror defined in claim 11 wherein said support means further includes a day/night mirror spherical ball in said day/night mirror holding frame and a blind spot mirror spherical ball in said blind spot mirror holding frame.

13. The rear view mirror defined in claim 12 wherein said day/night mirror moving means includes day/night mirror cables attached to said day/night mirror frame and to said control means, and said blind spot mirror moving means includes blind spot mirror cables attached to said blind spot mirror frame and to said control means.

14. The rear view mirror defined in claim 13 wherein said day/night mirror moving means and said blind spot mirror moving means include a cable attached to said U-shaped bracket and to said control means.

15. The rear view mirror defined in claim 13 wherein said day/night mirror cables are attached to said day/night mirror in at least three spaced apart locations and said blind spot mirror cables are attached to said blind spot mirror in at least three spaced apart locations.

16. The rear view mirror defined in claim 1 wherein said day/night mirror has a mid line and includes a height dimension measured between said top surface and a bottom surface and has said midline spaced from said rear rim a distance at least equal to or greater than said height dimension.

17. The rear view mirror defined in claim 1 wherein said control means includes a motor means for moving said day/night mirror and said blind spot mirror.

18. The rear view mirror defined in claim 17 wherein said control means further includes a relay.

* * * * *

UNITED STATES PATENT AND TRADEMARK OFFICE
CERTIFICATE OF CORRECTION

PATENT NO. : 5,500,766
DATED : March 19, 1996
INVENTOR(S) : Takashi IIDA et al.

It is certified that error appears in the above-indentified patent and that said Letters Patent is hereby corrected as shown below:

Col. 7, line 51, change "iS" to --is--.

Col. 11, line 65, change "lib" to --11B--.

Signed and Sealed this

Eleventh Day of June, 1996

*Attest:*

BRUCE LEHMAN

*Attesting Officer*     Commissioner of Patents and Trademarks